Sept. 26, 1950

J. VAHLE ET AL 2,523,791

AUTOMATIC TUNING SYSTEM

Filed Nov. 26, 1948

3 Sheets-Sheet 1

Inventors:
Julius Vahle,
Paul D. Heath,
by Claude A. Mott
Their Attorney.

Sept. 26, 1950 J. VAHLE ET AL 2,523,791

AUTOMATIC TUNING SYSTEM

Filed Nov. 26, 1948 3 Sheets-Sheet 2

Inventors:
Julius Vahle,
Paul D. Heath,
by Claude A. Mott
Their Attorney.

Sept. 26, 1950 J. VAHLE ET AL 2,523,791

AUTOMATIC TUNING SYSTEM

Filed Nov. 26, 1948 3 Sheets-Sheet 3

Inventors:
Julius Vahle,
Paul D. Heath,
by Claude A. Mott
Their Attorney.

UNITED STATES PATENT OFFICE 2,523,791

AUTOMATIC TUNING SYSTEM

Julius Vahle and Paul D. Heath, Syracuse, N. Y., assignors to General Electric Company, a corporation of New York Application November 26, 1948, Serial No. 62,173

8 Claims. (Cl. 219—47)

Our invention relates to automatic tuning systems for high frequency electrical circuits and more particularly to automatic tuning systems for circuits associated with the transmission and utilization of high frequency energy for heating.

It is the object of our invention automatically to match the impedence of a heater to the impedance of the transmission line connecting the heater to a source of high frequency energy.

It is generally known that the maximum amount of energy can be transferred between two pieces of electrical apparatus when their impedances are equal. This applies to a transmission line which supplies energy to a high frequency heater. The maximum energy can be transferred, and that energy will be used most efficiently when the impedance of the heater and the network associated with it, is equal to the impedance of the transmission line. While this is true at all frequencies, at high frequencies it is particularly important that the two impedances be kept in balance. At the same time, it is more difficult, at high frequencies, to keep them in balance. At high frequencies, a change in any of the circuit elements generally has a much more marked effect on the impedance balance than at low frequencies. An automatic tuning system is therefore very important at high frequencies, to compensate for changes in impedance which occur in the heater and keep this impedance in balance with the impedance of the transmission line.

In carrying out our invention in one form, we provide a heating chamber comprising two large horizontal parallel electrodes of electrically conductive material. The spacing between the two electrodes is manually variable and the material to be heated is passed between them, usually in the form of a continuous strip or on a conveyor belt. High frequency energy is supplied to the heating electrodes through a concentric conductor transmission line. The automatic tuning system comprises a variable capacitor in series with the electrodes and a variable inductor in parallel with them. The capacitance is varied automatically to maintain the phase angle between current and voltage in the transmission line at zero. The inductance is varied automatically to maintain the ratio of voltage to current in the transmission line at a value equal to the characteristic impedance of the transmission line. Thus, the load impedance is matched to the impedance of the transmission line.

Figure 1:
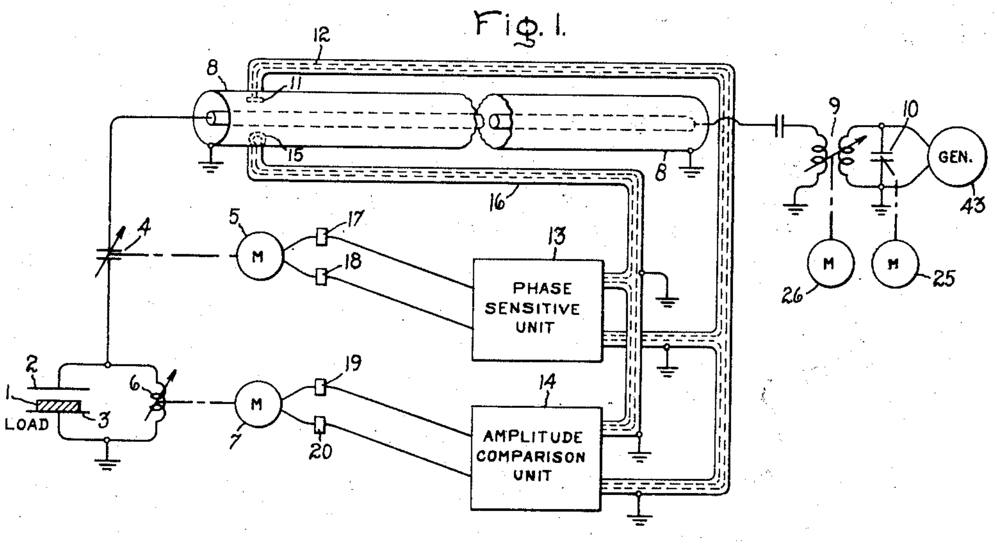
Figure 3:
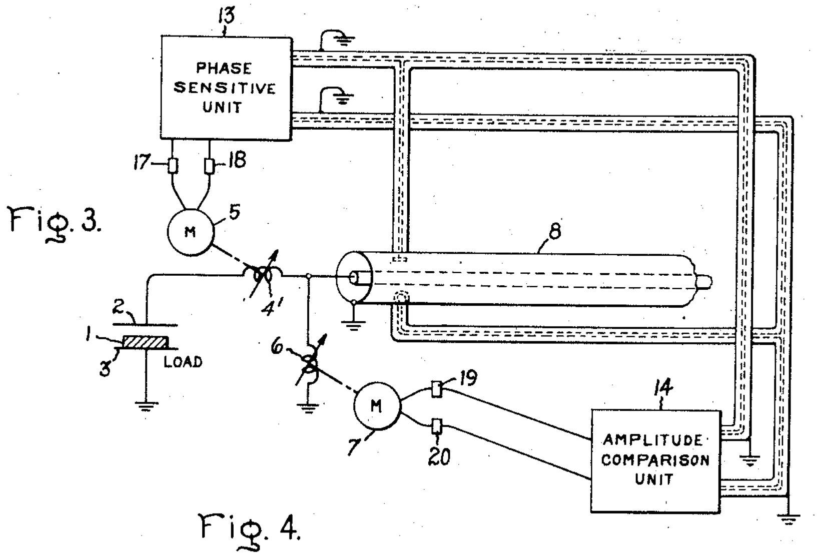
Figure 4:
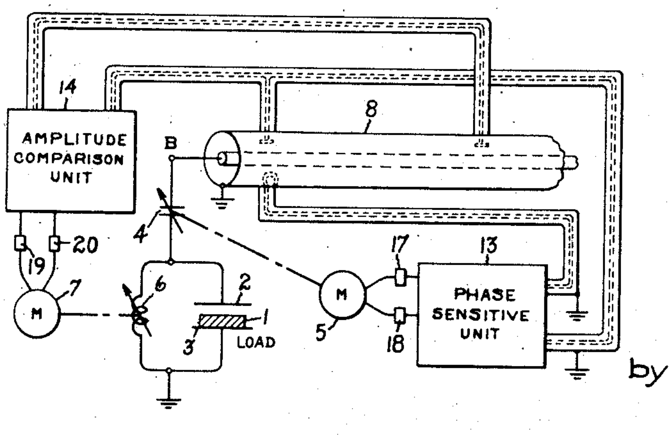
Figure 2A:
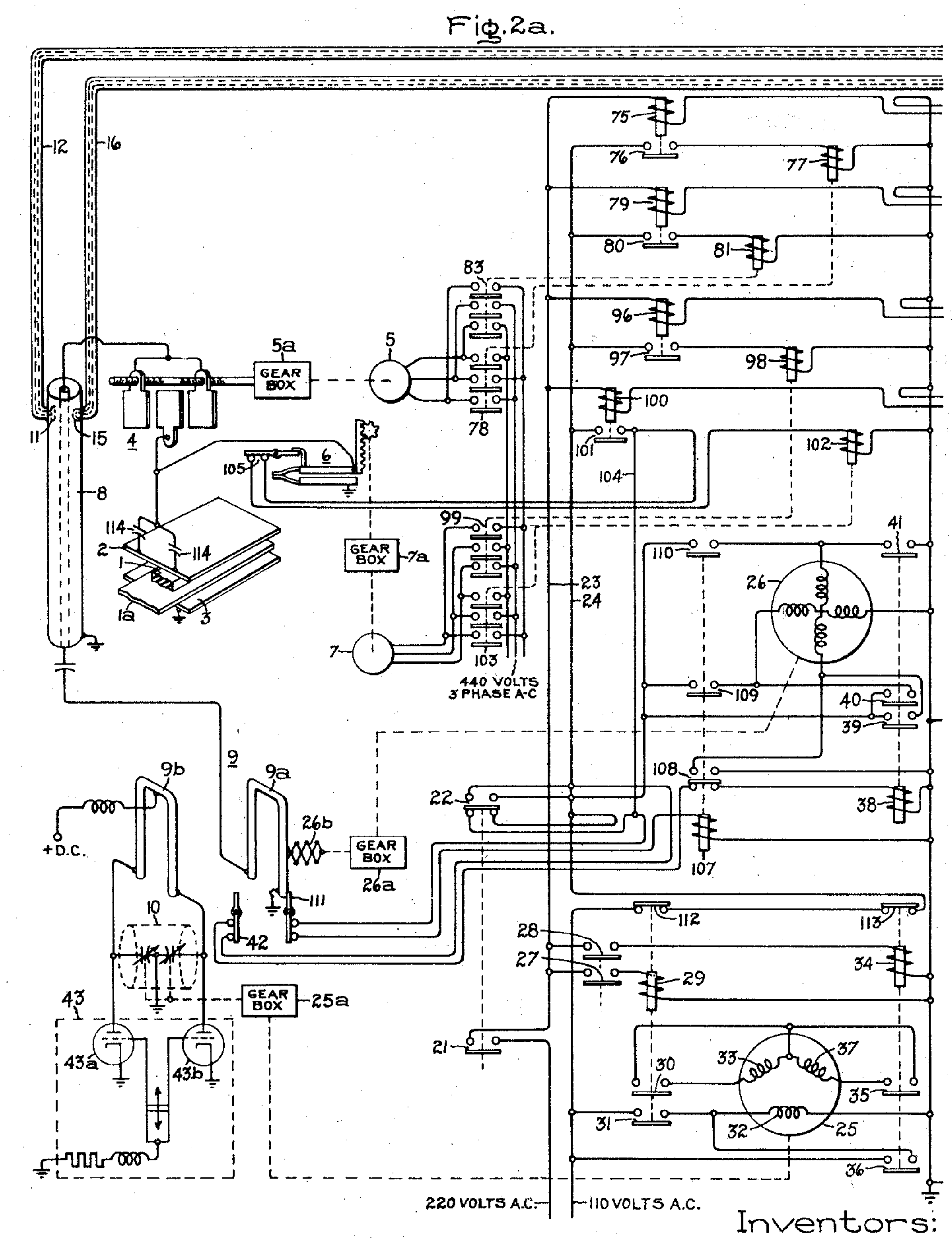
Figure 2B:
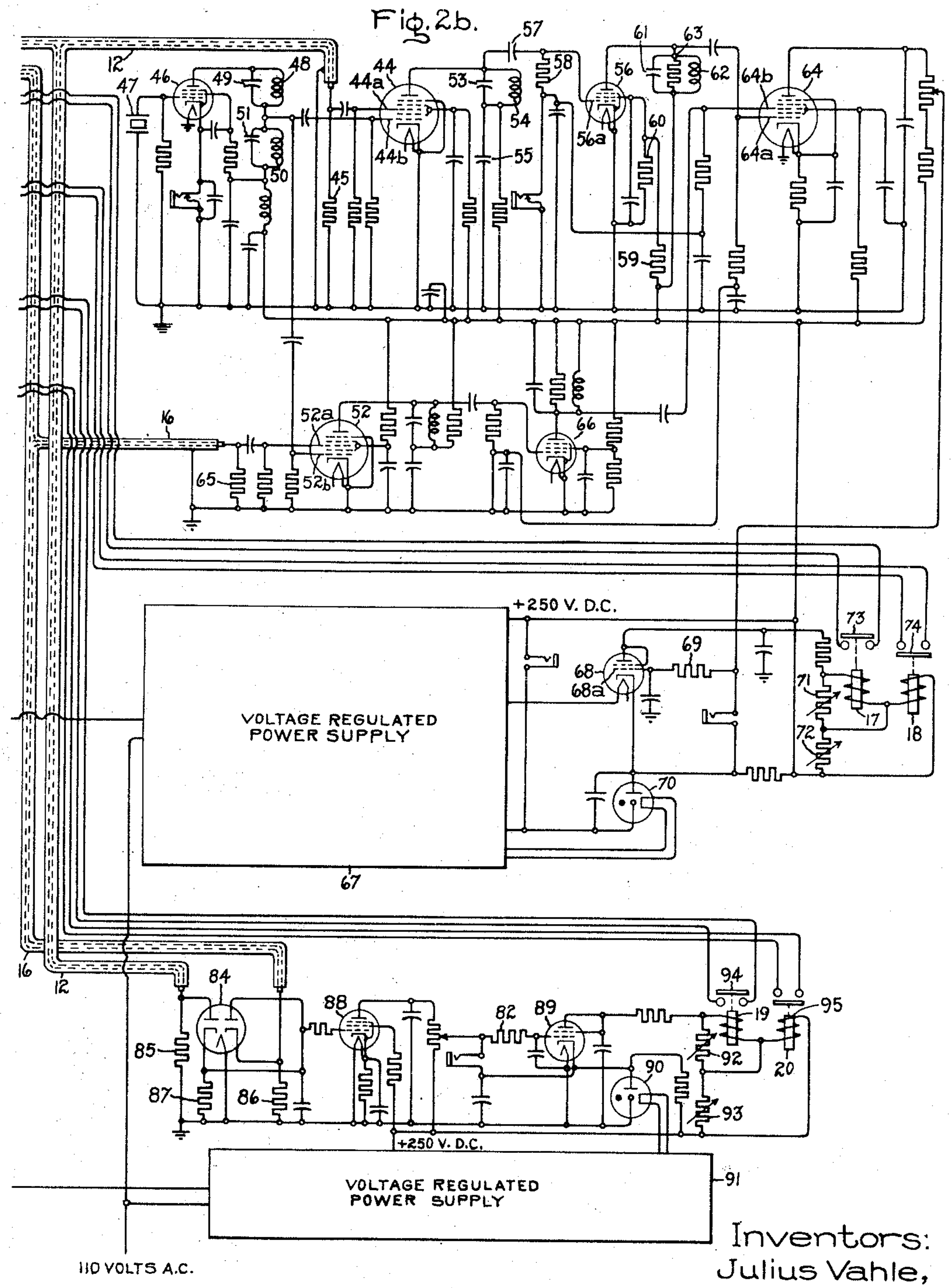

For a more complete understanding of our invention, reference should be had to the accompanying drawing. Fig. 1 of this drawing is a simple schematic diagram of one embodiment of our invention, which is described in detail below, while Figs. 2*a* and 2*b* are an electrical circuit diagram of this embodiment of the invention. Figs. 3 and 4 are schematic diagrams of two modifications of our invention.

Referring to Fig. 1 of the drawing, the material 1 to be heated is shown diagrammatically between heating electrodes 2 and 3. In series with the heating electrodes is variable capacitor 4 which is operated by reversible motor 5. In parallel with the heating electrodes is variable inductor 6 operated by reversible motor 7. The network composed of electrodes 2 and 3, variable capacitor 4 and variable inductor 6 is supplied with high frequency energy by generator 43 through transmission line 8. Generator 43 is coupled to the transmission line by coupling inductor 9. Inductor 9 is also used in conjunction with variable capacitor 10 to form the oscillatory or tank circuit of the generator.

The impedance of the load network is automatically matched to the impedance of the transmission line by a phase control unit 13 and an amplitude comparison control unit 14. Both control units receive a signal or control voltage from probe 11 through line 12 which is proportional to and in phase with the voltage in transmission line 8. Likewise, both control units receive a control voltage from loop 15 through line 16 which is proportional to and separated by ninety electrical degrees from the current in transmission line 8. Control units 13 and 14 function to adjust capacitor 4 and inductor 6 automatically to maintain a balance between the load impedance and the impedance of the transmission line. Control unit 13 controls variable capacitor 4 through reversible driving motor 5 and operating relays 17 and 18. Control unit 14 controls variable inductor 6 through reversible driving motor 7 and operating relays 19 and 20.

Referring to Figs. 2*a* and 2*b* of the accompanying drawing, which illustrate this embodiment of our invention in detail, the material 1 to be heated is shown in Fig. 2*a* supported by conveyor belt 1*a* between heating electrodes 2 and 3, each of which may be approximately 50 square feet in area. The two electrodes are parallel and may be rectangular in configuration. The spacing of electrodes 2 and 3 is variable over a range of several inches to accommodate various heating loads.

Variable capacitor 4, in series with the heating electrodes, employs air as a dielectric and is composed of three vertical parallel plates. The outer two plates comprise one pole and the center plate the other pole, with the outer plates being variable with respect to the center plate by means of a worm gear driven by reversible motor 5. Additional details on the construction and operation of inductor 6 and its driving motor 7 are given below.

In one typical apparatus embodying our invention, generator 43 is of the oscillatory electron discharge type arranged to oscillate at a frequency of 13,560 kilocycles. The generator is a conventional high frequency oscillator comprising two valves 43*a* and 43*b* which have their control electrodes connected together with the two valves connected to operate in phase opposition in conjunction with an oscillatory circuit comprising inductor member 9*b* and variable capacitor 10. Transmission line 8 which connects the high frequency generator to the load is of the concentric conductor type utilizing air as the dielectric.

Coupling inductor 9 is of the coupled hairpin type, that is, it comprises a fixed member 9*b* and a movable member 9*a* both shaped approximately like large hairpins with the two ends on both members projecting downward. Coupling between the two members is increased by moving the movable member 9*a* closer to stationary member 9*b* while maintaining the planes of the two members parallel. Variable capacitor 10, which is composed of two capacitor units in series, is of the pressurized gas-filled type with dry nitrogen gas as the dielectric.

In transmission line 8 is inserted probe 11, which acts as a potential divider between the center conductor and outer conductor of transmission line 8 to derive a small signal voltage that is proportional to and in phase with the transmission line voltage at that point. The signal voltage derived by probe 11 is transmitted through a small concentric conductor cable 12 to the phase sensitive control circuit and the amplitude comparison control circuit. Also inserted in transmission line 8 is loop 15, which through its linkage with the electromagnetic field within line 8 has induced therein a small signal voltage whose magnitude is proportional to the current in the transmission line and the phase of which is 90 degrees behind that of the current in the transmission line. The signal voltage from loop 15 is likewise transmitted through a small concentric conductor cable 16 to both the phase responsive circuit and the amplitude comparison circuit.

The phase sensitive circuit is responsive to the phase angle between the current and voltage in transmission line 8. It operates reversible motor 5 in the forward or reverse direction through a relay circuit which includes relays 17 and 18 to adjust the capacitance of variable capacitor 4 so that the phase angle in transmission line 8 is zero. The amplitude comparison circuit is responsive to the ratio of voltage to current in transmission line 8 and it adjusts the inductance of variable inductor 6 through the action of reversible motor 7 actuated by a relay circuit including relays 19 and 20 so that the ratio of voltage to current is equal to the characteristic impedance of transmission line 8.

In a typical apparatus embodying our invention, operation is begun by energizing the control circuits (not shown) of the high frequency generator 43. Thereafter, energizing potential is applied to the anodes of the high frequency generator to energize transmission line 8 and the heater network; simultaneously switches 21 and 22 are operated to energize lines 23 and 24. Energizing lines 23 and 24 energize the control circuits associated with motors 5 and 7 and motors 25 and 26.

Reversible motor 25 operates variable capacitor 10 in the tuned circuit of high frequency generator 43 through gear speed reducer 25*a*. Motor 25, in turn, is under the control of an automatic frequency regulator (not shown) which is responsive to the frequency of the generator. The automatic frequency regulator operates switches 27 and 28 to operate motor 25 in the required direction to secure the proper variation in capacitor 10 to maintain the frequency within desired limits which may be, for example, 13,560 kilocycles plus or minus .05%. When switch 27 is closed by the automatic frequency regulator, solenoid 29 is energized, closing switches 30 and 31. This energizes windings 32 and 33 of motor 25, and the motor rotates in the forward direction. When switch 28 is closed by the regulator, solenoid 34 is energized, closing switches 35 and 36. This energizes windings 32 and 37 of motor 25, and the motor operates in the reverse direction.

Coupling inductor 9 in the tank circuit of the high frequency generator is operated by motor 26 through a gear speed reducer 26*a* and a scissors jack mechanism 26*b*. When the anode circuit of the high frequency generator is closed and switch 22 is moved simultaneously to the upper position, solenoid 38 is energized, closing switches 39, 40 and 41. This energizes the windings of motor 26 so that the motor operates in the forward direction and moves movable member 9*a* of inductor 9 slowly toward the maximum coupling position. When movable member 9*a* reaches a predetermined position, limit switch 42 operates, opening the circuit to solenoid 38 and deenergizing motor 26.

When starting operation of the heater, motor 26 operates at slow speed to move inductor member 9*a* to the position which produces the desired amount of coupling, and during this time the automatic tuning system operates to match the load and transmission line impedances. Thus, only small amounts of power and relatively low voltages exist in the transmission line and heater circuits during the initial mismatched condition.

In the operation of the automatic tuning system, the phase sensitive circuit receives a signal voltage from probe 11 through concentric conductor 12 which appears on control electrode 44*a* of electron discharge device 44. Concentric conductor 12 is terminated in a resistor 45, the impedance of which is equal to the characteristic impedance of conductor 12 to minimize power reflections and standing waves on conductor 12.

Electron discharge device 46 is a beam power tetrode connected into a conventional crystal oscillator circuit. The piezoelectric crystal 47 may have a fundamental frequency of, for example, 4,020 kilocycles, and the anode circuit of device 46 comprising inductor 48 and capacitor 49 is tuned to this frequency. A resonant circuit comprising inductance 50 and capacitor 51 is tuned to the third harmonic frequency, i. e. 12,060 kilocycles, of crystal 47 and the voltage of this harmonic frequency across the resonant circuit 50, 51 is impressed on a control electrode 44*b* of electron discharge device 44 and control electrode 52*b* of electron discharge device 52.

Electron discharge device 44 is a conventional type of pentagrid converter or mixer. With a 12,060 kilocycle signal applied to control electrode 44*b* and a 13,560 kilocycle signal applied to control electrode 44*a*, the output current of this tube contains components comprising both the sum and difference of the two input frequencies.

The anode circuit of electron discharge device 44 comprising capacitor 53 and inductance 54 is tuned to the difference frequency of 13,560 minus 12,060 or 1,500 kilocycles. High frequency components are by-passed to ground through capacitor 55. On large signals, the output voltage of electron discharge device 44 increases only a fraction when the input signal voltage applied to electrode 44a increases several times. Hence, electron discharge device 44 functions also as a limiter on large input signals.

The 1,500 kilocycle voltage developed across resonant circuit 53, 54 is impressed on control electrode 56a of electron discharge device 56 through capacitor 57. Electron discharge device 56 functions as a limiter, that is, the output voltage of device 56 is substantially constant regardless of the magnitude of the signal voltage applied to control electrode 56a. This limiting action is obtained by the use of a resistor 58 to provide a grid bias which increases with increasing signal input and the use of a low screen voltage to reduce the anode current. The low screen voltage is obtained by the use of large resistors 59 and 60 in the screen electrode circuit of electron discharge device 56. Capacitor 61 and inductance 62 constitute a resonant circuit tuned to a frequency of 1,500 kilocycles in the output circuit of electron discharge device 56. A resistor 63 provides this circuit with a relatively broad band pass characteristic. Due to the amplitude limiting action of device 56, the output voltage of tuned circuit 61, 62 remains substantially constant even though the signal voltage from probe 11 varies over a wide range of amplitudes.

The constant voltage output of device 56 is impressed on control electrode 64a of an electron discharge device 64. Device 64 operates as a phase detector, and its operation is described in detail in the patent application Serial No. 62,172 of J. Vahle, F. E. Goodness and P. D. Heath, filed concurrently herewith and which is assigned to the assignee of the present application.

The signal voltage induced in loop 15 is transmitted through concentric conductor 16 and appears on control electrode 52a of electron discharge device 52. Concentric conductor 16 is terminated in resistor 65, the impedance of which is equal to the characteristic impedance of conductor 16 to minimize power reflections and standing waves thereon. Concentric conductor 16 and concentric conductor 12 are of equal length so that equal phase delay occurs in both conductors.

When the 13,560 kilocycle signal voltage from loop 15 is impressed on electrode 52a and the 12,060 kilocycle voltage from the resonant circuit 50, 51 is impressed on electrode 52b, electron discharge device 52 functions as a mixer and limiter in a manner similar to that of electron discharge device 44. The frequency of the output current of device 52 is 1,500 kilocycles, the same as device 44. The output voltage of device 52 is impressed upon the input electrode of electron discharge device 66, which functions in a manner similar to that of device 56 to provide a constant amplitude output voltage regardless of variations in the signal voltage from loop 15. This constant output voltage is impressed on control electrode 64b of electron discharge device 64.

The anode circuit of electron discharge device 64 is supplied with a unidirectional operating voltage from a conventional voltage regulated power source 67. The output voltage of device 64 may vary, for example, from +30 volts D. C. to +200 volts D. C. when operated from a 250 volt D. C. supply, this voltage variation corresponding to a variation in phase angle between the current and voltage in transmision line 8 of minus 90 degrees to plus 90 degrees. The output voltage of device 64 is impressed on the control electrode of electron discharge device 68 through a voltage dropping resistor 69. The cathode of device 68 is maintained at a constant positive potential with respect to ground by an electron discharge device 70 of the gas filled voltage regulator type. Hence, the unidirectional output voltage of device 64 varies between predetermined negative and positive voltage limits relative to the cathode of device 68. This voltage is impressed on the grid of device 68 except that voltage dropping resistor 69 prevents the grid potential from becoming positive.

The output voltage of device 68 is impressed across solenoid relays 17 and 18 in series. Variable rheostats 71 and 72 connected in parallel respectively with relays 17 and 18 provide means to adjust the relative currents in the two solenoid relays so that both of a pair of switches 73 and 74, controlled by the two solenoids, are open when the automatic tuning system is in balance.

Switch 73 operates inversely to switch 74, the former being of the normally closed type while switch 74 is of the normally open type. When the system is completely deenergized, switch 73 is closed and switch 74 is open. As the current flowing through the series circuit composed of solenoids 17 and 18 increases, solenoid 17 operates, at a predetermined minimum amount of current, to open switch 73. With a continued increase in current, solenoid 18 operates at a second and higher predetermined minimum amount of current to close switch 74.

When additional capacitance is required to adjust the phase angle between current and voltage in transmission line 8 to zero, solenoid 17 is deenergized sufficiently that switch 73 closes. This energizes solenoid 75, closing switch 76. This, in turn, energizes solenoid 77 which closes three phase contactor 78. The closing of contactor 78 operates motor 5 in the forward direction through gear speed reducer 5a to increase the capacitance of variable capacitor 4 sufficiently to return the phase angle in transmission line 8 to zero.

When a decrease in capacitance is necessary to restore the phase angle in transmission line 8 to zero, solenoid 18 operates to close switch 74. This energizes solenoid 79 which closes switch 80. This in turn energizes solenoid 81 which closes three phase contactor 83. Closing contactor 83 operates motor 5 in the reverse direction until the capacitance of variable capacitor 4 is reduced sufficiently to restore the phase angle in transmission line 8 to zero.

Variable capacitor 4 is operated at a rapid rate compared to variable inductor 6, the operation of which is described below. In one typical apparatus embodying our invention capacitor 4 is variable from the minimum position of 30 micromicrofarads to the maximum position of 200 micromicrofarads in 5 seconds. The tuning system is adjusted so that the switch 73 closes to restore the phase angle to zero if the phase angle in transmission line 8 becomes less than −5°, whereas switch 74 closes if the phase angle exceeds +5°.

In the operation of the amplitude comparison control circuit a signal voltage from probe 11 is transmitted through coaxial conductor 12 and impressed on one anode of a duo-diode electron discharge device 84. Concentric conductor 12 is terminated in resistor 85, the impedance of which is equal to the characteristic impedance of conductor 12 to prevent power reflections and standing waves on conductor 12. The signal voltage from loop 15 is transmitted through concentric conductor 16 and is impressed on the cathode of the second diode of device 84, the anode of this second diode being connected to the cathode of the first diode. Conductor 16 is terminated in resistor 86, the impedance of which is equal to the characteristic impedance of conductor 16 to prevent power reflections and standing waves on conductor 16.

The unidirectional output voltage of electron discharge device 84 which appears across a resistor 87 connected between the cathode of the first diode and ground is proportional to the difference in the amplitudes of the signal voltages from probe 11 and loop 15. The operation of device 84 is described in detail in the application S. N. 62,174 of Paul D. Heath filed concurrently herewith and which is assigned to the assignee of the present application.

The output voltage of device 84 is impressed on the input electrode of an electron discharge device 88 which functions as a conventional amplifier. The output voltage of device 88 is in turn impressed on the control electrode of an electron discharge device 89 through a voltage dropping resistor 82. Device 89 functions in a manner similar to that of device 64. The voltage from device 88, which is impressed on the grid of device 89 varies between predetermined positive unidirectional voltage limits. The cathode of device 89 is maintained at a fixed positive potential above ground potential by an electron discharge device 90 of the gas filled voltage regulator type. Thus, the output voltage of device 88 varies within predetermined negative and positive unidirectional voltage limits relative to the cathode of device 89. This voltage is impressed on the control electrode of device 89 except that voltage dropping resistor 82 prevents the control electrode potential from becoming positive.

The anode circuit of device 89 is energized by connection with a conventional voltage regulated power source 91. The output voltage of device 89 is used to operate solenoid relays 19 and 20. Variable rheostats 92 and 93, connected respectively in parallel with solenoid relays 19 and 20, provide adjustment of the relative currents in the two solenoid relays so that both of the switches 94 and 95, which are operated by the two solenoids, are open when the system is in balance. Switch 94 is of the normally closed type while switch 95 is of the normally open type. Switch 94 remains closed unless the current in solenoid 19 exceeds a predetermined amount while switch 95 remains open unless the current in solenoid 20 exceeds a second higher predetermined amount.

When the signal voltage from transmission line 8 indicates that additional inductance is required to match the load impedance to the transmission line impedance, solenoid 19 operates to close switch 94. This energizes solenoid 96 to close switch 97. This in turn energizes solenoid 98 to close three phase contactor 99. The closing of contactor 99 operates motor 7 in the forward direction through gear speed reducer $7a$ to increase the spacing between the two members of variable inductor 6 and thus increase its inductance sufficiently to raise the total load impedance to the desired amount.

When the signal voltage from transmission line 8 indicates that less inductance is required, solenoid 20 operates to close switch 95. This energizes solenoid 100 to close switch 101. This in turn energizes solenoid 102 to close three phase contactor 103. Closing contactor 103 operates motor 7 in the reverse direction to reduce the spacing between the elements of variable inductor 6 thus reducing the inductance of inductor 6. Consequently, the total load impedance is reduced. Motor 7 continues operation until the load impedance is equal to the impedance of transmission line 8.

A conductor 104 connecting switch 101 to switch 22 is provided to return variable inductor 6 to its lowest or minimum inductance position when operation of the automatic tuning system is stopped. When the anode circuit of the high frequency generator is opened to stop operation, switch 22 returns to the lower position to energize solenoid 102 and close three phase contactor 103. This contactor operates motor 7 in the reverse direction in the same manner as it is operated under the control of the amplitude comparison circuit. Motor 7 operates to lower the upper member of variable inductor 6 until limit switch 105 is operated to open the circut to solenoid 102, deenergize the control circuits to motor 7, and stop the movement of variable inductor 6.

Tuning inductor 6 operates at a relatively slow rate compared to variable capacitor 4. Inductor 6 may travel the full range from minimum inductance position to the maximum inductance position in approximately 30 seconds. During the time that inductor 6 is in motion in either direction variable capacitor 4 is continually adjusted by the phase sensitive control circuit to restore the phase angle in transmission line 8 to zero. Since capacitor 4 operates at a considerably faster rate than inductor 6, it is possible for the former to complete several operations during one operation of the latter.

Variable inductor 6 is composed of parallel flat plates with a flexible electrically conductive connection at one end to form a short-circuited section of transmission line. The spacing between the plates is adjustable to vary the inductance. Inductor 6 is described in detail in application S. N. 62,171 of Julius Vahle, now Patent No. 2,494,596, filed concurrently herewith and which is assigned to the assignee of the present application.

Coupling inductor 9 in the tank circuit of the high frequency generator is connected so that it also returns to the minimum coupling and the minimum reactance position whenever the main heating circuits of the apparatus are deenergized by opening the anode circuit of the high frequency generator. When the anode circuit of the generator is opened, switch 22 is returned to the lower position indicated on the accompanying drawing. This energizes solenoid 107 which moves switch 108 to the upper position and closes switches 109 and 110. This energizes the windings of motor 26 in a manner such that the motor operates in the reverse direction and moves the movable member $9a$ of inductor 9 toward the minimum coupling and minimum reactance position. This motion continues until limit switch 111 opens, deenergizing solenoid 107 and stopping motor 26.

An important feature of our invention is an interlock on motor 25 driving variable capacitor 10 which prevents the operation of the other three motors associated with the automatic tuning system during the time that motor 25 is operating. By operating motor 25 only when the frequency of the generator lies outside the selected frequency band limits, the automatic tuning system does not function during the time that the frequency of the generator does not fall within these limits. This control is provided by switches 112 and 113, one of which is opened when either of solenoids 29 or 34, which control the operation of motor 25, is energized. If either of switches 112 or 113 is opened, all control circuits for motors 5, 7 and 26 operating respectively variable capacitor 4, variable tuning inductor 6 and coupling inductor 9 are deenergized. This assures that these motors will stop if they are running when either switch 112 or switch 113 is opened and they cannot start again until motor 25 has ceased to operate and both of switches 112 and 113 are closed. This interlocking eliminates spurious response of the automatic tuning system when the frequency is outside the band limits, and reduces unnecessary interaction between the various elements of the automatic tuning system.

Fixed capacitors 114 may be provided in series with the load electrodes 2 and 3 to reduce the large capacitance of the load electrodes and make it possible to use a smaller variable inductor 6 in parallel therewith for tuning purposes.

In Fig. 3 there is illustrated one modification of our invention. This has a variable inductance 4' substituted for variable capacitor 4 in the automatic tuning system and is suitable for use with loads requiring series inductance rather than capacitance to match the load impedance to the transmission line impedance. The two variable inductances in this modification may be any conventional type such as the variable stub type or the rotating coil type, or they may be of the type illustrated by inductor 6 of Figs. 1 and 2.

Another modification is illustrated by Fig. 4 in which there is provided different means for obtaining the signal voltages for the amplitude comparison control circuit. In this form of our invention two probes are inserted in the concentric conductor transmission line spaced apart by a distance of from $1/10$ to $1/4$ wavelength. The signal voltages from these two probes are proportional to the standing wave ratio in the transmission line which is a measure of the power reflected back from the load due to impedance mismatch. The two signal voltages are used to control the amplitude comparison circuit so that the standing wave ratio is adjusted to a minimum, at which point the load impedance and the transmission line impedance are equal. In other words, the variable inductor in parallel with the load is adjusted so that the signal voltages from the two probes are equal.

While we have illustrated and described one preferred embodiment of our invention, together with two modifications, many additional modifications will occur to those skilled in the art. It should be understood, therefore, that we intend to cover by the appended claims any such modifications as fall within the true spirit and scope of our invention.

What we claim as new and desire to secure by Letters Patent of the United States is:

1. A tuning system for a load supplied with high frequency energy by a transmission line, comprising means for deriving a signal proportional to and in phase with the voltage in said transmission line, means for deriving a signal proportional to and out of phase with the current in said transmission line, a variable reactance in series with said load, means utilizing said two signals for deriving the phase angle between the current and voltage in said transmission line, means responsive to said phase angle deriving means for varying said series reactance to adjust said phase angle to a preselected value, a variable reactance in parallel with said load, means for determining the ratio of transmission line impedance to load impedance, and means responsive to said ratio determining means and operative simultaneously with said series reactance varying means for varying said parallel reactance to adjust said ratio to a predetermined value.

2. A tuning system for a load supplied with high frequency electrical energy by a transmission line, comprising means for deriving a signal proportional to and in phase with the voltage in said transmission line, means for deriving a signal proportional to and out of phase with the current in said transmission line, a variable capacitive reactance connected in series circuit relationship with said load, means utilizing said two signals for deriving the phase angle between the current and voltage in said transmission line, means responsive to said phase angle deriving means for varying said series capacitive reactance to adjust said phase angle to substantially zero, a variable inductive reactance connected in parallel with said load, means utilizing said two signals for deriving the ratio of voltage to current in said transmission line, and means responsive to said ratio deriving means and operative simultaneously with said series reactance varying means for varying said inductive reactance to adjust said ratio to a predetermined value.

3. An automatic tuning system for a high frequency heater, the load of which is provided with electrical energy by means of a transmission line, comprising means for deriving a signal voltage proportional to and in phase with the voltage in said transmission line, means for deriving a signal voltage proportional to and out of phase with the current in said transmission line, a variable capacitive reactance in series with said load, means utilizing said two signal voltages for deriving the phase angle between the current and voltage in said transmission line, means responsive to said phase angle deriving means for varying said series capacitive reactance to adjust said phase angle to a preselected value, a variable inductive reactance in parallel with said load, means utilizing said two signal voltages for determining the ratio of transmission line impedance to load impedance, and means responsive to said ratio determining means and operative simultaneously with said capacitive reactance varying means for varying said inductive reactance to adjust said ratio to a predetermined value.

4. An automatic tuning system for a high frequency heater, the load of which is provided with heating energy by means of a concentric conductor transmission line, comprising probe means for deriving a signal voltage proportional to and in phase with the voltage in said transmission line, loop means for deriving a signal voltage proportional to and separated by ninety electrical degrees from the current in said transmission line, a variable capacitive reactance in series with said load, means utilizing the two said signal voltages for determining the phase angle between the current and voltage in said transmission line, means responsive to said phase angle determining means for varying said series capacitive reactance to adjust said phase angle to zero, a variable inductive reactance in parallel with said load, means utilizing the two said signal voltages for determining the ratio of voltage to current in said transmission line, and means responsive to said ratio determining means and operative simultaneously with said series reactance varying means for varying said parallel inductive reactance to adjust said ratio to a value equal to the characteristic impedance of said transmission line.

5. An automatic tuning system for a high frequency electrical heating apparatus, the load of which is provided with heating energy by means of a transmission line, comprising probe means for deriving a signal voltage proportional to and in phase with the voltage in said transmission line, loop means for deriving a signal voltage proportional to and separated by ninety electrical degrees from the current in said transmission line, a variable capacitive reactance in series with said load, reversible motor means for operating said capacitive reactance, means utilizing said two signal voltages for deriving a voltage responsive to the phase angle between current and voltage in said transmission line, relay means responsive to said derived voltage for operating said motor means, whereby said capacitive reactance is adjusted to maintain said phase angle substantially zero, a variable inductive reactance in parallel with said load, reversible motor means for operating said inductive reactance, means utilizing said two signal voltages for deriving a voltage responsive to the ratio of voltage to current in said transmission line, and relay means responsive to said last-named derived voltage and operative simultaneously with said first-named relay means for operating said last-named motor means, whereby said inductive reactance is adjusted to maintain said ratio at a predetermined value.

6. An automatic tuning system for a high frequency heating apparatus, the load of which is provided with electrical heating energy by means of a concentric conductor transmission line, for matching the impedance of the load and the impedance of the transmission line, comprising a generator having a selected frequency band width, means for coupling said generator to said transmission line, a probe positioned in said transmission line between the two conductors for deriving a signal voltage proportional to and in phase with the voltage in the transmission line, a loop positioned in said transmission line between the two conductors for deriving a signal voltage proportional to and separated by ninety electrical degrees from the current in the transmission line, a variable capacitive reactance connected in series with said load, reversible motor means for operating said capacitive reactance, means utilizing said two signal voltages for deriving a voltage responsive to the phase angle between current and voltage in said transmission line, relay means responsive to said derived voltage for operating said motor means, whereby said capacitive reactance is adjusted to maintain said phase angle substantially zero, a variable inductive reactance in parallel with said load, reversible motor means operative simultaneously with said capacitive reactance motor means for operating said inductive reactance, means utilizing said two signal voltages for deriving a voltage responsive to the ratio of the transmission line impedance to the load impedance, relay means responsive to said last-named derived voltage and operative simultaneously with said first-named relay means for operating said last-named motor means, whereby said inductive reactance is adjusted to maintain said ratio at a predetermined value, and means associated with said generator for discontinuing operation of said capacitive reactance motor means and said inductive reactance motor means when the frequency of said generator is outside the selected band limits.

7. An automatic tuning system for a high frequency heater, the load of which is provided with heating energy by means of a concentric conductor transmission line, comprising probe means for deriving a signal voltage proportional to and in phase with the voltage in said transmission line, loop means for deriving a signal voltage proportional to and separated by ninety electrical degrees from the current in said transmission line, a variable capacitive reactance in series with said load, means utilizing the two said signal voltages for determining the phase angle between the current and voltage in said transmission line, means responsive to said phase angle determining means for varying said series capacitive reactance to adjust said phase angle to zero, a variable inductive reactance in parallel with said load, double probe means for deriving a signal voltage proportional to the standing wave ratio in said transmission line, and means responsive to said last-named signal voltage and operative simultaneously with said series reactance varying means for varying said parallel inductive reactance automatically to maintain said standing wave ratio at unity.

8. An automatic tuning system for a high frequency heater, the load of which is provided with electrical energy by means of a transmission line, comprising means for deriving a signal voltage proportional to and in phase with the voltage in said transmission line, means for deriving a signal voltage proportional to and out of phase with the current in said transmission line, a variable inductive reactance in series with said load, means utilizing said two signal voltages for determining the phase angle between the current and voltage in said transmission line, means responsive to said phase angle determining means for varying series reactance to adjust said phase angle to approximately zero, a variable inductive reactance in parallel with said load, means utilizing said two signal voltages for determining the ratio of voltage to current in said transmission line, and means responsive to said ratio determining means and operative simultaneously with said series reactance varying means for varying said parallel reactance to adjust said ratio to a predetermined value.

JULIUS VAHLE.
PAUL D. HEATH.

REFERENCES CITED

The following references are of record in the file of this patent:

UNITED STATES PATENTS

| Number | Name | Date |
|---|---|---|
| 2,438,595 | Zottu | Mar. 30, 1948 |
| 2,456,800 | Taylor | Dec. 21, 1948 |

OTHER REFERENCES

"Radio Engineering" by Terman (3rd edition) published in 1947 by McGraw Hill.